United States Patent Office 3,371,655
Patented Mar. 5, 1968

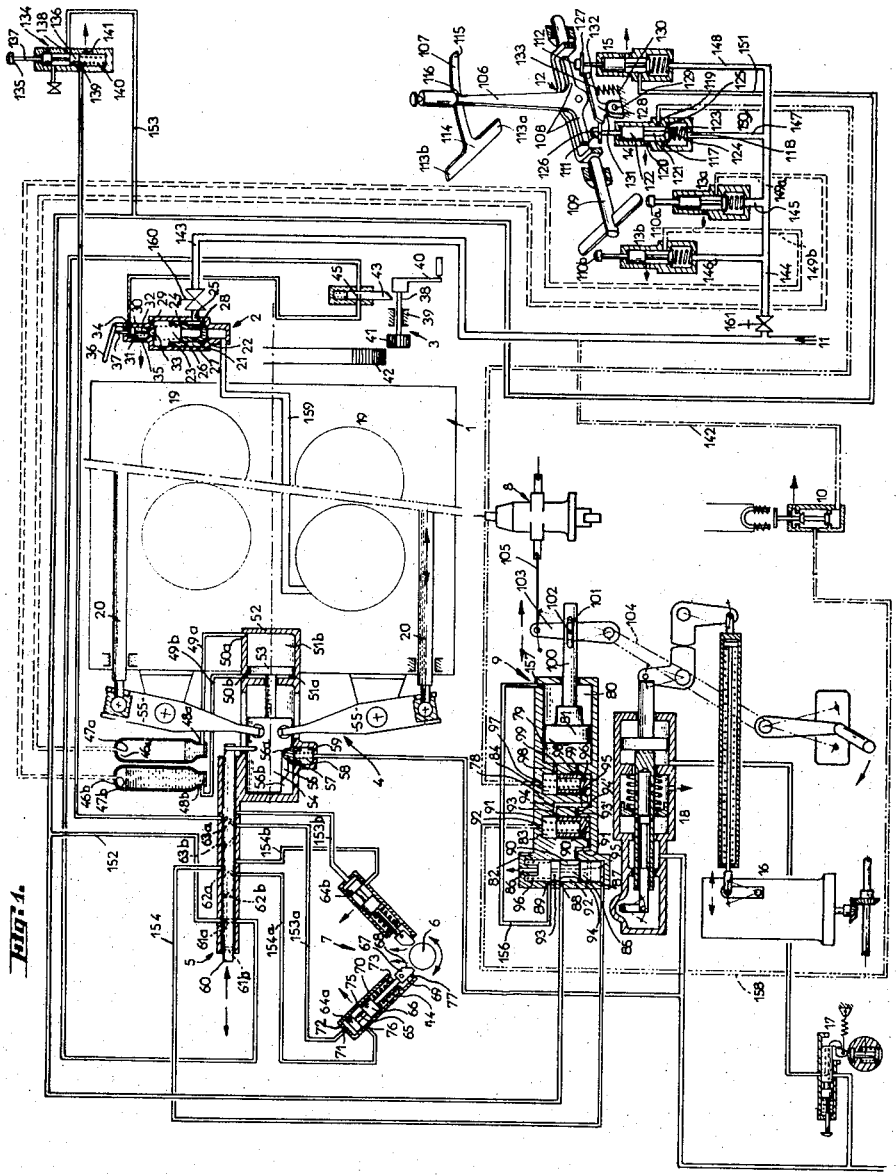

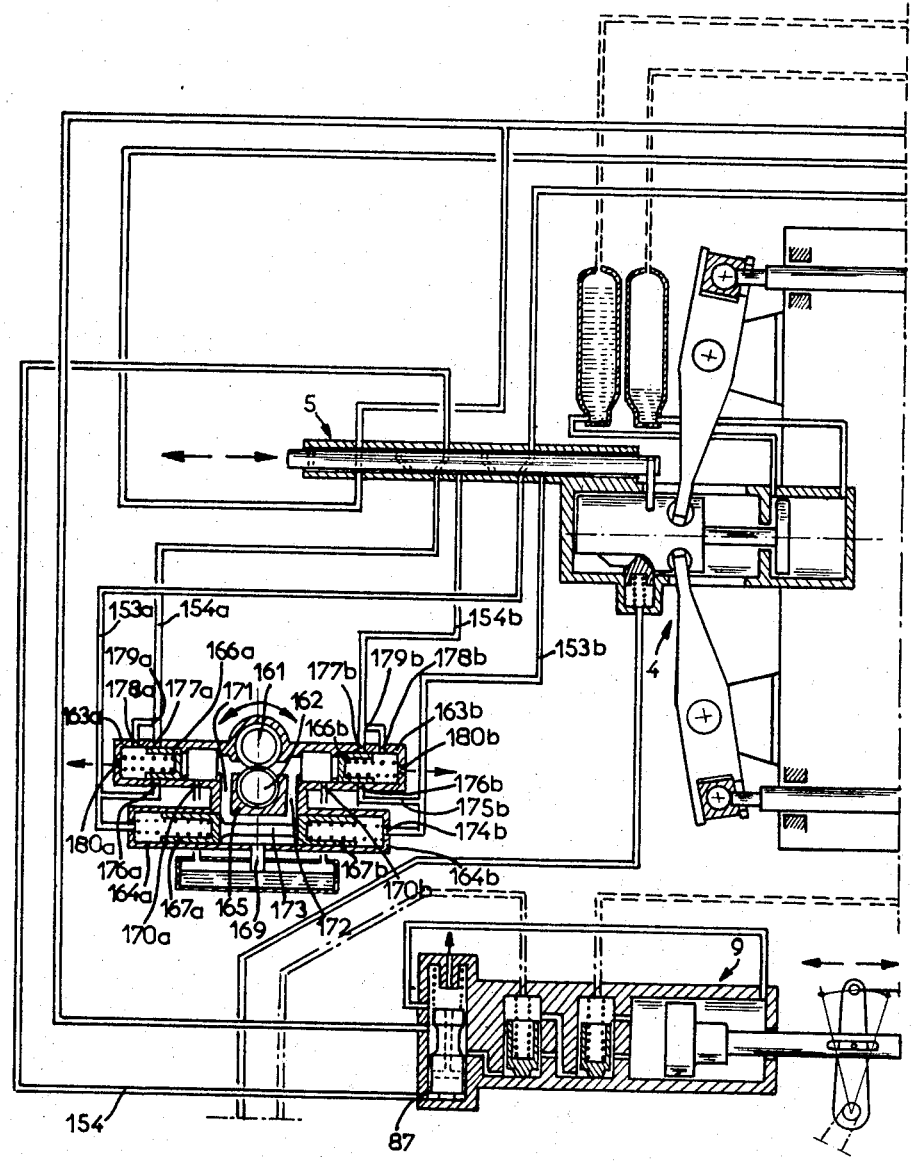

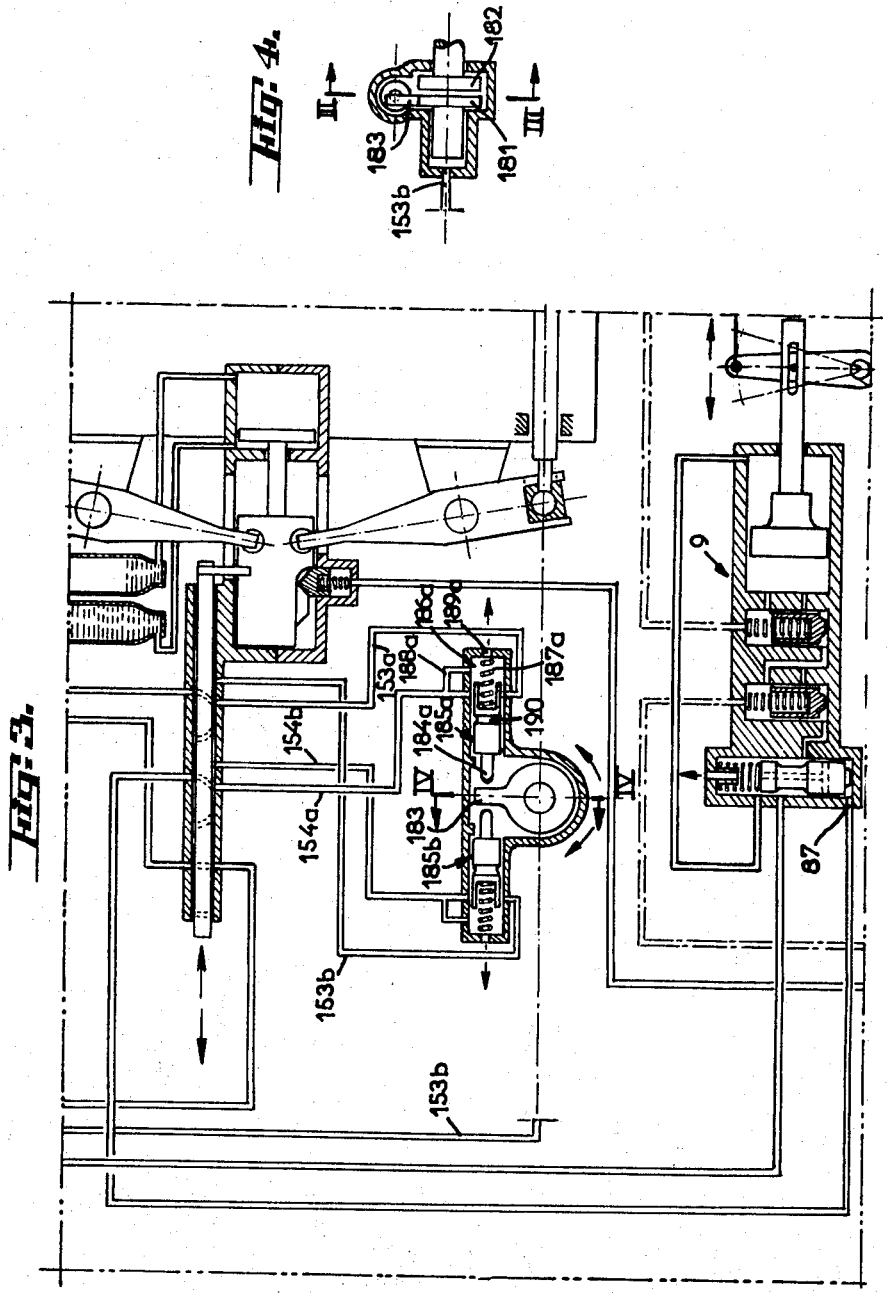

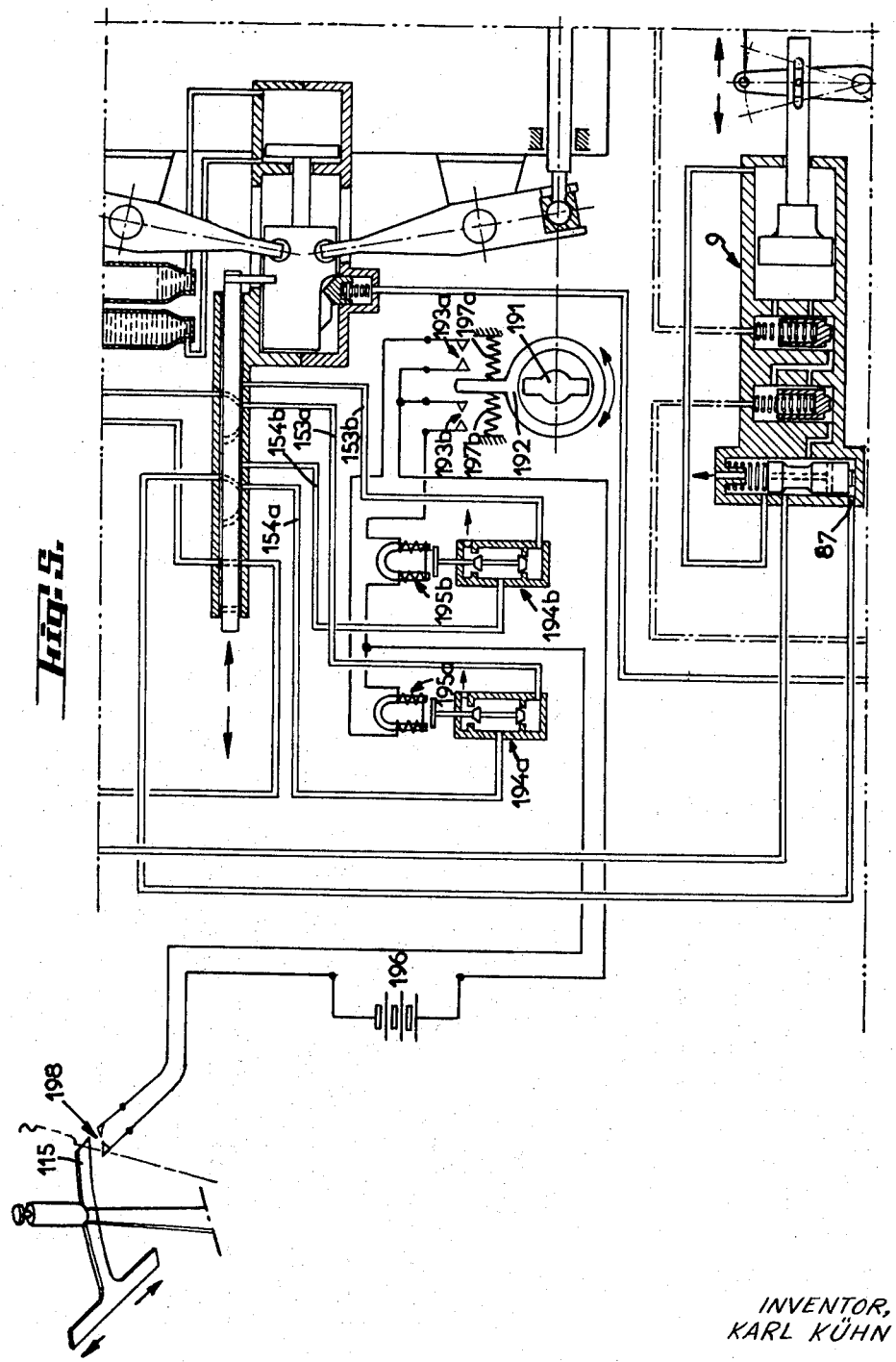

3,371,655
SAFETY SYSTEM FOR SPEED REVERSAL
IN HEAT ENGINES AND THE LIKE
Karl Kühn, Saint-Germain-en-Laye, France, assignor to
Societe d'Etudes de Machines Thermiques, Saint-Denis,
France, a body corporate of France
Filed Dec. 8, 1965, Ser. No. 512,417
Claims priority, application France, Dec. 10, 1964,
998,288
8 Claims. (Cl. 123—41)

ABSTRACT OF THE DISCLOSURE

A safety system for speed reversal in heat engines fed by a fuel pump and having a speed reversing apparatus and a main control station. The means for preventing the admission of fuel and of air adapted to stop the engine during the speed reversing operation comprise in particular a one-block unit controlling the fuel pump and enclosing three chambers arranged in succession and forming slideway for slide valves respectively responsive to three separated devices of the system, i.e. means for detecting the direction of rotation of the engine, a stopping valve provided in the main control station and an electrically-controlled safety valve circuit.

---

The present invention has chiefly for its object a safety system for heat engines and the like, in particular for engines on board ships and propeller driven vehicles incorporating a speed reversing apparatus operated for instance by oil subjected to pressure and starting means controlled by compressed air, said arrangement being adapted to protect the engine against an exaggerated pressure in the cylinders at the moment of the speed reversal when manoeuvring the ship or the like vehicle.

In such a type of ship engine, constituted frequently by a diesel engine, means are generally provided for preventing the admission of fuel and of air adapted to start the engine inside the cylinders during the speed reversing operation. However, when the speed reversing apparatus is at the end of its operative stroke, that is when it is operatively connected for forward or rearward operation, it is necessary to cut out the possibility of starting the engine without special care being taken. It can occur as a matter of fact that the engine is driven by the wake of the propeller in a direction of rotation opposed to that provided by the speed reversing apparatus. Under such conditions, the simultaneous introduction of starting air and of fuel inside the cylinders during the compression stroke, would lead to objectionable extra pressures detrimental to the proper operation and to the reliability of the engine.

The improved arrangement according to the present invention has for its object to cut out said inconvenient conditions and it is remarkable chiefly through the fact that it includes inside a pneumatic circuit a safety system for the starting, which system is controlled by the axial location of the camshaft in association with a detector of the direction of rotation of the engine and with a unit controlling the admission of fuel cooperating with said detector.

It will be readily understood that such an arrangement allows braking, under the action of air, the rotation of the engine while it allows the admission of fuel, by reason of the cooperation between the unit controlling the admission of fuel and the detector of the direction of rotation of the engine, only when the latter starts moving in the direction of rotation corresponding to that provided by the speed reversing apparatus.

The invention covers also the engines and driving machines and also the apparatus, plants and systems incorporating arrangements of the above-mentioned type.

Other features of the invention will appear from the reading of the following description:

In the accompanying drawings given out solely by way of example:

FIGURE 1 illustrates diagrammatically and in sectional view the improved arrangement according to the invention;

FIGURE 2 is a sectional view of the arrangement executed in accordance with a modified embodiment of the detector of the direction of rotation of the engine;

FIGURE 3 is a partial sectional view of the arrangement illustrating a further embodiment of said detector;

FIGURE 4 is an axial sectional view of the detector illustrated in FIGURE 3, the section line being illustrated at IV—IV in said FIGURE 3;

FIGURE 5 is a partial sectional view of the arrangement according to a third embodiment of the detector of the direction of rotation.

In the embodiment illustrated in FIGURE 1, the engine 1 is illustrated diagrammatically as associated with starting means operating for instance under the action of air, such as a main valve 2 controlling the starting air, said engine being provided furthermore with a speed reversing apparatus 4 and with means 5 selecting the direction of rotation. There is also illustrated a hub 6 driven by the engine and with which are associated a detector 7 of the direction or rotation of the engine and a fuel pump 8 feeding the engine and connected with a control unit 9, said control unit cooperating with a safety electrically-controlled valve 10. The pneumatic circuit fed by a supply 11 distributes compressed air to the different units, either directly to the units 2 and 10 or else to the units 4, 5, 7 and 9 through the agency of a control station 12 provided with four valves, to wit a forward movement valve 13a, a rearward movement valve 13b, a stopping valve 14 and a starting valve 15.

On the other hand, the connection between the control unit 9 and the fuel pump 8 is associated with adjusting means including a regulator 16, a releasing means 17 operating for excess speeds and an abutment controlling system 18 which is fed by the oil pressure prevailing in the engine.

The engine 1, illustrated by two rows of cylinders 19 shown partly in sectional view, is for instance of the reversible type and carries along its sides timing shafts 20 carrying the cams controlling the suction, exhaust and the like valves. Said cams are located on said shafts pairwise so as to form two sets of cams, a rear set and a front set adapted to replace each other through a longitudinal translational movement of the timing shafts.

The main valve for the starting air 2 which forms at the same time the air-controlled braking unit for the safety arrangement according to the invention, is a differential valve of a large cross-section, which may be controlled either pneumatically by the input of air out of the valve 15 or else by hand through the agency of a lever. Said valve 2 includes a closing member 21 urged onto its seat 22 by a spring 23 and adapted to slide inside a chamber 24 having a large cross-section and provided with an input port 25. The closing member is of a tublar shape flaring outwardly at its upper end, so as to define inside the chamber 24, two compartments 26 and 27 communicating with each other through a pressure equalizing port 28. The compartment 26 communicates through a port 29 with a control chamber 30, inside which slides a piston 31 connected through its rod 32 with a valve body 33 adapted to close the port 29. Said chamber is provided at its upper end with an air admission port 34 allowing a thrust to be exerted by the piston 31 while there is provided in its side wall a port 34 leading to a drain 35. A hand-controlled lever 36 fitted on the outside of the chamber 30 and engaging an extension 37 of the piston rod 32 allows opening manually the valve 33.

There is provided a turning gear 3 constituted by a shaft 38 sliding inside a guideway 39 and carrying at one of its ends a driving crank 40 and at its other end a pinion 41 adapted to mesh with a sunwheel 42 rigid with the driving shaft. In its inoperative position, that is when the pinion 41 has released the sunwheel 42, a slide valve 43 engaged by a spring 44 allows the passage of air through the channel 45 along the pipe opening into the port 34 of the main valve controlling the starting air. The end of the slide valve 43 is provided with an oblique surface wherethrough said slide valve can be raised by a thrust exerted by the crank 40 when the turning gear enters an operative position, the pinion 41 being then coupled with the sunwheel 42. The channel 45 of the slide valve 43 is then shifted and the admission of air into the pneumatic control means for the main valve controlling the starting air is cut off.

The speed reversing apparatus 4 is constituted by two bottles 46a, 46b carrying a liquid under pressure such as oil for instance, and provided at their upper ends with air input ports 47a, 47b and at their lower ends with fluid exhaust ports 48a, 48b communicating through the corresponding channels 49a, 49b with the ports 50a, 50b opening into the compartments 51a, 51b of the operative chamber 52 of a double acting piston 53. Said piston 53 is connected through its rod with a shaft 54 to which are pivotally secured the rotula-carrying levers 55 connected with the timing shafts 20. The shaft 54 carries furthermore a boss 56 forming two notches 56a and 56b engaged by a collapsible cam 57 subjected to the action of the spring 58. The action of the spring 58 is increased by the oil pressure prevailing in the housing 59 inside the cam 57, which housing is connected with the lubricating system of the engine. The boss 56 and cam 57 form a locking system preventing any shifting of the shaft 54 when the pressure of air inside the bottle 46 is no longer operative.

The selector controlling the speed reversal 5 is constituted by a slide valve 60, rigid with the shaft 54 and provided with two series of three channels 61a, 62a, 63a and 61b, 62b, 63b, ensuring for the end-of-stroke positions of the piston 53 of the speed-reversing apparatus, uninterrupted connections to be defined hereinafter and the cutting off of said connections for the intermediate positions of the piston 53.

The detector 7 of the direction of rotation of the engine, is constituted by a unit including two pistons 64a and 64b arranged symmetrically to either side of a plane passing through the axis of the hub 6. The rod 65 of such a piston 64 carries a closing slider 66 on an intermediate portion of its length while its free end carries a block 67 pivotally secured to the end of said rod and provided with an oblique surface 66 and with a straight surface 69. The bottom 72 of the chamber 70 of the piston is provided with a port 71 through which air is admitted. The side walls of this chamber are provided on the one hand, with a draining port 75 and on the other hand, with a lateral output 76 for the channel connected with the unit 9 controlling the fuel pump. A spring 74 engaging the bottom 73 of the chamber 70 and the slider 66 returns the piston 64 into its starting position. A stop 77 arranged in alignment with the chamber 70 adjacent the bottom 73 forms a bearing surface for the right hand surface 69 of the block.

The unit 9 controlling the fuel pump 8, is constituted by a casing 78 of which a section forms a main operative chamber subdivided into two compartments 79 and 80 and enclosing a double-acting piston 81 while the other section of said casing defines three chambers 82, 83 and 84 arranged in succession ahead of the compartment 79 of said main chamber.

The chamber 82 forms a slideway for a slide valve 85. It is provided with at least five ports, to wit a draining port 86 in its upper cover, a port 87 at the lower end of its side wall, providing for the input of air controlling the movements of the slide valve 85, furthermore, in an intermediate section of its side wall, two ports 88 and 89 providing respectively for the admission of air from the starting valve 15 of the main control station and for an output of air towards the second compartment 80 of the main chamber and lastly a port 90 opening into the channel 91 connected with the chamber 83. The slide valve is provided with a peripheral recess 92 capped by a shoulder 93 while on the other hand, a channel 94 passing axially through said slide valve 85 opens into a transverse channel 95 through its lower end and into the draining port 86 through its upper end when the slide valve is in its raised position. A return spring 96 holds the slide valve 85 in its lower position in the absence of any input of air through the port 87. The height of the shoulder 93 and that of the peripheral recess 92 correspond respectively to the smallest and to the largest spacing between the ports 88 and 89.

The chamber 83 forming a slideway for the tubular closing member or safety member 90, which is urged back by a spring 91, is provided in its upper cover with a port 92 opening into the channel connected with the electrically-controlled safety valve 10 while its lower end is provided with a port opening into the channel 91. One or more ports 93 and 93' are provided, on the other hand, on its side wall for the channels 94 and 94' opening into the channel 95 communicating with the chamber 84.

The chamber 84, the structure of which is substantially identical with that of the precedingly disclosed chamber, forms a slideway for a closing or stopping member 96 urged back by a spring, and provided, in its upper section, with a port 97 opening into the channel connected with the stop valve 14 of the main control station while its lower end is provided with a port opening into the channel 95. One or more ports 98 and 98' are, on the other hand, provided in its side wall, so as to open into the channels 99 and 99' connected with the first compartment 79 of the main chamber.

The rod 100 of the piston 81 is provided with an elongated port 101 forming a guideway for a tenon 102 rigid with an arm 103 rigid with a shaft 104 and pivotally secured at its other end to a rod 105 connected with the fuel pump 8.

The main control station 11 includes a lever 106 guided along two rectangular directions of movement by a T-shaped slideway 107, and acting on a first swing-bar 108 and on a second swing-bar 109 so as to engage respectively the pusher knobs 111, 112 and 110a, 110b for the valves 14, 15 and 13a, 13b respectively. The positions of the lever 106 in its slideway correspond to these various operations and are illustrated at 114, 115 and 113a, 113b on the slideway as also the so-called normal position 116 intermediate between the positions 114 and 115. It may be remarked, in accordance with the distribution of the different positions of the lever inside its slideway, that the second swing bar 109 when it acts on one of the two valves 13a and 13b, constrains necessarily the first swing bar 108 to act on the stop valve 14. Each of the four valves of the main control station 12 is designed in a substantially similar manner and includes a chamber 117 provided at its lower end with an input port 118 and laterally, on the downstream side of the valve seat, with an output port 119 and also with a draining port 120. The stem of the valve 121 carries a slider 122 adapted to close said draining port while its free end terminates with a pusher knob 111. A return spring 125 urges the valve body 124 onto its seat 125. The valves 14 and 15 termed respectively the stopping and starting valves, carry under the pusher knobs 111 and 112, on their stems, a small retaining plate 126, 127 which allows the action of a locking block 128 secured to the frame of the control station. Said block is constituted by a lever-shaped member pivoting round an axis 129 on the frame 130 of the control station. One end 131 of said lever forms a collapsible retaining projection cooperating with the small plate 126 while the other end 132 of said lever forms a bearing point for the small plate 127 and is connected with a return spring 133 secured to the frame.

In the embodiment illustrated in FIGURE 1, a slide valve 134 controlled manually by the pusher-knob 135, is inserted in the pneumatic circuit between the starting valve 15 and the admission of air at 71 into the detector 7 of the direction of rotation of the engine, ahead of the selector 5 controlling the speed reversal. Said slide valve 134 is constituted by a closing slider fitted in a chamber 136 and located on the rod 137 of the pusher member 135 so as to be held between the input and output ports 138 and 139 in its inoperative position through the agency of a spring 140. A draining port 141 is provided in the chamber 136.

Different channels distributing compressed air into the pneumatic circuit fed by the supply 11 will now be described.

The main channel is connected with the feed pipe 142 for the electrically-controlled safety valve 10, with the feed pipe 143 for the main valve 2 controlling the starting air, and with the feed pipe 144 for the valve of the main control station. The two last-mentioned pipes 143 and 144 are provided with a cock cutting them out of the circuit as shown respectively at 160 and 161. The pipe 144 is connected with branch pipes forming the input pipes 145, 146, 147 and 148 opening respectively into the valves 13a, 13b, 14 and 15 and said valves feed the corresponding output pipes 149a and 149b opening through the ports 47a and 47b into the bottles of the speed reversing apparatus 4, the pipe 150 opening through the port 97 into the chamber 84 of the closing member 96 and the pipe 151 opening through the port 88 into the chamber 82 of the slide valve in the control unit 9. Said pipe 151 is connected with the branch pipe 152 feeding the pneumatic control port 34 of the main valve controlling the starting air 2 and also with the branch pipe 153 feeding the detector 7 of the direction of rotation of the engine. Said two pipes 152 and 153 extend inside the speed reversal selector respectively through the channels 61a, 63a for the forward progression position of the speed reversing apparatus and through the channels 61b and 63b for the rearward movement position of said speed reversing apparatus. At the output of the speed reversal selector 5, the pipe 153 extends as the pipe 153a or as the pipe 153b, according as to whether the connection corresponding to the position of the speed reversing apparatus is provided through the channel 63a or the channel 63b of the slide valve of the speed reversal selector.

A pipe 154 connects the lateral output 76 of the chamber enclosing the piston of the detector of the direction of rotation of the engine with the port 87 opening into the lower end of the slide valve of the control unit 9. Said pipe passes through the speed reversal selector through the agency of the channels 62a and 62b and is associated also with two branch pipes 154a and 154b, said branch pipes serving selectively according as to whether the connection, corresponding to the position assumed by the speed reversing apparatus, is performed through the channel 62a or through the channel 62b of the slide valve of the speed reversal selector. Lastly, inside the control unit 9 for the fuel pump, a channel 156 connects the port 89 in the chamber of the slide valve 82 with the port 157 of the second compartment 80 of the main operative chamber of the control unit 9.

A channel 158 connects the output port of the electrically-controlled safety valve 10 with the port 92 of the chamber 88 of the control unit 9 for the fuel pump. An air collector 159 starting from the output port of the main valve for the starting air opens into one or more cylinders of the engine.

To sum up, the operation of the whole arrangement according to the invention and of the units associated therewith, will now be disclosed. FIGURE 1 illustrates the speed reversing apparatus engaged in its forward movement position, which position corresponds to a normal clockwise direction of rotation of the hub 6. The operation of the arrangement will be first disclosed when, assuming the pusher knob 135 on the slide valve 134 inserted in the channel 153 is held in its depressed position, the speed reversing apparatus is brought into its rearward movement position.

Starting from the "normal" position of the lever, shown at 116 on the guiding slideway, all the circuits are drained and there is no air pressure in the channels, except inside the input channels 142 to 148 inclusively.

The lever is brought into its "stop" position shown at 114 on the guiding slideway 107 which produces a thrust of the swing bar 108 on the pusher knob 111 of the stopping valve 14. The slider 122 of said valve is then shifted downwardly in a manner such as to close the draining port 120. Simultaneously, the valve body 124 moves off its seat 125, which provides thus a connection between the pipe 147 and the pipe 150. The compressed air is admitted through the port 97 inside the chamber 84 of the closing member of the control unit 9 and from this point, into the first compartment 79 of the main chamber of the control unit 9. The piston urges back, through the arm 103, the rod 105 of the fuel pump 8 and the injection of the fuel pump 8 and the injection of fuel is cut off.

The lever is then returned into its rearward position shown at 113b on the guiding slideway 107, the first swing bar 108 continuing its action on the pusher-knob of the stopping valve 14; the second swing bar 109 carried along by the lever 106, bears on the pusher knob 110b of the rearward movement valve 13b. The slider closing said valve closes the draining port and connects the channels 146 and 149b with each other. The compressed air is admitted inside the bottle 46b of the speed reversing apparatus 4 through the port 47b and urges the oil of the bottle back inside the compartment 51b of the operative chamber 51 of the speed reversing apparatus 4, through the agency of the pipe 49b and of the port 50b. The piston urges thus, through the agency of the shaft 54 and of the rotula-carrying levers 55, the distributing shafts 20 into their rearward movement position. Simultaneously, the slide valve of the speed reversal selector 5 is shifted towards its rearward movement position by the shaft 54.

The lever is then returned towards the stopping position shown at 114 on the guiding slideway 107, which produces the closing of the valve 13b and the opening of the corresponding drain, which allows the compressed air to escape out of the rearward bottle 46b into the atmosphere. The speed reversing apparatus is set thus in its rearward movement position.

The lever is now returned into its "normal" position shown at 116 on the guiding slideway, the swing bar 108 no longer engages the stopping valve 14, but said valve cannot close since the block 128 bears through its end 131 on the small plate 126 and opposes the rising movement of the valve rod 121. The injection of fuel into the engine cylinders 1 is still cut off.

The lever is urged towards the starting position indicated at 115 on the guiding slideway, which leads to a pressure exerted by the first swing bar 108 on the pusher knob 112 of the starting valve 15. The small plate 127 of said pusher knob rocks the block 128 round its axis 129, releasing thus the small plate 126 with reference to the projection 131 holding it. The valve 14 closes and the channel 150 is set in communicatiion with the draining port 120, while, inside the valve 15, the channels 148 and 151 are interconnected and the draining port is closed through the agency of the slider. Through the pipes 152, 153b and 151, the compressed air is admitted selectively into the port 34 controlling the main valve for the starting air, into the port 71b of the detector of the direction of rotation and, through the speed reversal selector 5 and into the port 88 of the chamber 82 of the slide valve of the control unit 9, without passing through the speed reversal selector.

The compressed air fed by the pipe 152 into the control port 34 of the main starting valve, produces the shifting of the piston 31 and the draining at 35 of the compartment 26 defined by the tubular closing member 21, through the opening of the valve 33. The pressure inside said compartment being lowered to a value underneath the pressure prevailing inside the compartment 27, the closing member 21 rises and sets in communication the pipes 143 and 159 of the main starting air valve whereby the compressed air is fed into the engine cylinder or cylinders.

The compressed air reaching in the pipe 153b the port 71b in the chamber 10b of the piston 64b of the detector 7 of the direction of rotation, produces a thrust on the piston 64b which engages through the rod 65b and the block 67b, the hub 6. Two cases may be considered according as to whether the engine revolves in the normal direction, that is in the direction defined by the speed reversing apparatus, i.e. an anticlockwise direction in the example illustrated or in the out of normal direction, that is in a direction opposed to that given out by the position of the speed reversing apparatus, i.e. in the clockwise direction in the example considered.

In the first case, the rotation of the hub urges the block into rotation in the direction shown by the arrow while allowing a sinking of the rod 65b of the piston 64b. The piston is then shifted down to the position for which its surface extending on the side corresponding to the port 71b, lies underneath the lateral output 76b. When in said position, the piston closes the draining port 75b. The pipes 153b and 154b are thus connected with each other, and the compressed air reaches the chamber 82 of the slide-valve of the control unit 9 through the port 87, which produces a rising of said slide valve.

The rising of the slide valve 85 inside the chamber 82 results on the one hand in the feeding with compressed air, through the channel 88, of the compartment 80 of the operative chamber in the control unit 9, the pipes 151 and 156 being connected with each other through the peripheral recess 92, and, on the other hand, in a draining of the compartment 79 of the operative chamber, provided the electrically-controlled safety valve 10 is closed. The piston 81 is then shifted and shifts the rod 105 so as to control the injection of fuel. It will be remarked that, in the control unit, the draining of the compartment 79 is executed in three successive stages: firstly inside the slide valve 85, the channel 94 being set in communication with the draining port 86 and the channel 95 in communication with the channel 91 in a manner such that the air which may lie underneath the safety closing member 90 is drained at 86. The channel 93 is then set in communication through a lowering of the safety closing member 90 with the output 92 of the channel 158 in a manner such that the air remaining underneath the stopping closing member 96 is drained through the electrically-controlled safety valve 10 in its closed position, and lastly the channel 99 is set in communication, through a lowering of the stopping closing member 96, with the output 97 of the channel 150 in a manner such that the air inside the compartment 79 is drained at 120 in the valve 14 in its closed position. In particular, by opening the electrically-controlled safety valve 10, the compartment 79 is fed with compressed air together with the pipe 150 and the channels 93, 95 and 99' and the pressure inside said compartment which is retained since the channel 99 is closed by the closing member 96 in its raised position, opposes any shifting of the piston 81 in the direction corresponding to injection of fuel.

In the second case, the rotation of the hub exerts a thrust on the oblique surface 68b of the block 67b while urging said block through its straight surface 69b against the stop 77b. The piston rod cannot sink and the lateral output 76b is no longer fed. The slide valve 85 in the chamber 82 is held in its lower position by its spring 96. The lowering of the slide valve 85 inside its chamber 82 has for its result, on the one hand, to feed with compressed air through the channels 91, 94', 95 and 99' the compartment 79 of the operative chamber of the control unit 9, the channel 151 being set in communication with the channel 91 through the agency of the peripheral recess 92 and the shoulder 93, lying between the ports 88 and 89, preventing any connection between the pipes 151 and 156, and, on the other hand to drain at 86 of the compartment 80 of the operative chamber through the port 157, the pipe 156, the port 89 and the section of the chamber 82 released by the slide valve 85. The piston 81 has then a tendency to be shifted in the direction corresponding to the stopping of fuel injection.

It will be remarked that, in said second case, the pneumatic control of the opening of the main valve for the starting air, which depends only on the engagement of the speed reversing apparatus in an end-of-stroke position, has always for its result to send compressed air into the engine cylinders. However, while the engine rotates in an out of normal direction, said air enters the cylinders during the compression stroke. It has been shown on the other hand, that the injection of fuel is cut off simultaneously. The unit 2 operates therefore as an air-operated braking unit for the engine.

Lastly, in the operation described hereinabove, it has been assumed until now that the pusher knob 135 on the slide valve 134 was depressed. It is thus apparent that the arrangement allows the automatic stopping of the injection of fuel when the engine revolves in a direction opposed to that given out by the position of the speed reversing apparatus. The cutting off of the pipe 153, by the slide valve 134 in its inoperative position, prevents furthermore fuel injection in the first case, i.e. when the engine revolves in the direction given by the position of the speed reversing apparatus. This provides thus a supplementary safety means controlling the admission of fuel inside the cylinders, whereby it is possible to turn the engine with air without any admission of fuel. The arrangement 134 is merely optional and may be cut out by short-circuiting the corresponding pipes 153 without this preventing the correct operation of the whole system, which can be very easily subjected to automation.

The advantages of the arrangement according to the invention are obvious. Firstly the use of the valve for starting air as a braking means cuts out the necessity of a supplementary apparatus and of the pipes required by the latter. The whole arrangement is operated, on the other hand, by means of compressed air and may therefore make use of the power produced by the air compressors existing already normally in the seafaring plants for manoeuvring purposes. Perfect safety is obtained, in particular through the agency of the circuit of the electrically-controlled safety valve which may be actuated, in case of failure, for instance by manually-controlled or thermostat-controlled switches or by any other apparatus controlling the correct operation of the engine. The direct admission of air inside the cylinders during the compression stroke of the pistons when the engine revolves in an out of normal direction, provides means for the elastic braking and exerts only a slight extra stress on the different parts of the engine. The bulk of the arrangement is reduced and may be suitable for all plants incorporating reversible engines.

Numerous modifications may be brought to the arrangement described, without unduly widening the scope of the invention, as defined in the accompanying claims.

Thus in particular the detector of the direction of the rotation of the engine may be subjected to numerous modifications.

In a first example, the detector of the direction of rotation may be constituted by a gear pump of the type illustrated in FIGURE 2 driven by the engine. The toothed wheel 161, for instance, receives its rotary movement from the hub 6 driven by the engine. The toothed wheel 162 is carried inside a casing 165. The body 160 of said pump includes four cylindrical chambers 163a, 163b and 164a, 164b arranged pairwise and symmetrically to either side of the plane defined by the axis of the wheels 161, 162, said chambers enclosing two pistons with hollow cylindrical bodies 166a, 166b and two sliders 167a, 167b, said pistons and sliders being each urged forwardly by a spring bearing against the bottom of the corresponding chamber. The two sliders 167a and 167b are rigidly interconnected by a rod 173. A container 168 filled with a liquid such as oil for instance, is connected with the pump body through the agency of a central pipe 9 and with the chambers 166 through corresponding discharge pipes, respectively 170a and 170b. The casing 165 defines with the body 160 two symmetrical clearances forming suction pipes, respectively 171 and 172 for the oil in the container 168. The pipes 153a and 153b leading out of the main valve controlling the starting air open respectively in the ports 174a and 174b provided in the bottom of the cylinders 164a and 164b. Branch pipes 175a and 175b on said pipes open respectively into the sides of the cylindrical chambers 163a and 163b through ports 176a and 176b.

Inside each cylinder 163, a port 177 diametrically opposed to the port 176 provides communication, respectively through the pipes 154a and 154b, with the port 87 in the control unit 9. The bottom of the cylinders 163 is provided with a draining port 180 connected for an inoperative position, with a branch pipe 179 on the channel 154 passing out of the chamber 163 through the port 178, uncovered for the inoperative position by the piston 166.

The very simple operation of said detector of the director of rotation will be described for the same example selected for a general disclosure of the operation of the arrangement illustrated in FIGURE 1. As in the case of the detector of the direction of rotation 7, illustrated in FIGURE 1, two cases are to be considered according as to whether the engine revolves in a normal direction, that is in the direction given out by the speed reversing apparatus, i.e. an anti-clockwise direction or in an out-of-normal direction.

In the first case, the rotation of the hub provides for the suction of the pump to be exerted on the chamber 166a and its delivery on the chamber 166b. On the other hand, the compressed air fed by the pipe 153b produces a shifting of the slider 167b which closes the passageway 172 in a manner such that the pump is fed with fluid on its suction side through the passageway 171. The piston 166b is then urged back towards the end of the chamber 163b which cuts off the draining port from the shunt pipe 179b and uncovers on the other hand the ports 176b and 177b so as to allow thereby the interconnection of the pipes 175b and 154b. The compressed air reaches the port 87 of the control unit 9 and provides for the injection of fuel inside the cylinders.

In the second case, the rotation of the hub actuates the pump in a manner such that the delivery is connected with the chamber 166a and the suction with the chamber 166b. But, in this case, the pump is no longer fed with fluid since, as already disclosed, the passageway 172, which is located now on the suction side, is closed under the action of the compressed air fed through the pipe 153b. The piston 166b remains in its inoperative position and the connection between the pipes 153b and 154b is cut off. The circuit of compressed air inside the control unit 9 is established in the direction of a cutting off of fuel injection.

In a second embodiment, illustrated in FIGURES 3 and 4, it is possible to use as a detector of the direction of rotation, an apparatus including a friction disc 181 bearing (FIGURE 4) against a disc 182 revolving with the hub 6, under the action of compressed air fed by the pipe 153b. The first disc 181 is provided at a point of its periphery with a cam 183 the angular movement of which is limited in both directions by the stops 184a and 184b rigidly secured respectively to the sliders 185a and 185b. Inspection of FIGURE 3 shows that said sliders are arranged in a symmetrical manner with reference to the plane of the cam 183, in the cylindrical chambers 186a and 186b against the bottom of which bear springs 187a, 187b urging the sliders towards the cam. Through the wall of each chamber 186a, or 186b, there open in registry with a channel 153a or 153b passing out of the main valve controlling the starting air, a channel 154a or 154b leading towards the control unit 9. Furthermore a branch pipe 188a or 188b connected with the channel 153a or 153b opens in the vicinity of the bottom of the corresponding chamber 186a or 186b, said bottom of the chamber 186a or 186b being provided with a draining port 189a or 189b.

Each slider 185a, 185b is constituted by a cylindrical body provided substantially at an intermediate section thereof with a peripheral recess 190 while the end of said slider facing the bottom of the chamber 186a or 186b is hollow and forms a bearing for the cooperating spring 187a or 187b.

In its inoperative position, the disc 181 is held in a central position by the two antagonistic springs 187a and 187b. When the disc 182 rotates in a direction corresponding to that provided by the speed reversing apparatus, the draining of the shunt pipe 188 is closed by the slider 185 while the channels 153 and 154 communicate through the agency of the peripheral recess 190 so that the compressed air reaches, as in the preceding embodiments, the port 87 of the control unit 9 which produces the injection of fuel into the cylinders. In the opposite case, there is no feed through the port 87.

According to a third modification, the means detecting the direction of rotation may be constituted as illustrated in FIGURE 5 by an electric apparatus including a magnetized rotor 191 driven by the hub 6 and a stator 192 adapted to rock angularly in a direction depending on the direction of rotation. The stator 192 acts on the switches 193a, 193b so as to close the circuit of an electrically controlled valve 194a or 194b of the type illustrated for instance at 10 in FIGURE 1 and feeding the channels 154a or 154b leading to the port 87 in the control unit of the fuel pump. The energizing windings 195a, 195b of the electrically-controlled valves 194a, 194b are inserted in parallel across the terminals of a supply 196, each winding being inserted in series with a switch 193a, 193b. In its inoperative condition, the stator 192 is held in a central position under the action, for instance, of two antagonistic springs 197a, 197b.

A safety switch 198 located at 115 in the main control station 12 and adapted to be coupled with the control of the valve 15 controls the closing of the circuit feeding the electrically-controlled valves 194a, 194b.

Obviously, the invention is by no means limited to the arrangement described and illustrated by way of examplification and it covers all the modifications thereof falling within the scope of the accompanying claims.

What I claim is:
1. A safety system for the speed reversing operation of diesel type engines, fed by a fuel pump and having a speed reversing apparatus and at least one axially displaceable timing camshaft, said system comprising in a pneumatic circuit fed by a source of compressed air, a main hand-operated control station including four valves, a forward movement valve and a rearward movement valve controlling said speed reversing apparatus, a starting and a stopping valve, said stopping valve remaining in its open position as long as said starting valve has not been operated, respectively a main valve controlling the air starting the engine, said valve being provided with means opening it under the action of input of air from said starting valve, means for detecting the direction of the engine, a unit controlling the admission of fuel by said fuel pump, a slide valve distributor associated with said speed reversing apparatus and preventing the supply of air from said starting valve to said unit controlling the admission of fuel into said means opening said main air starting valve whenever the speed reversing apparatus has not reached one end of its operative action, said unit controlling the admission of fuel by said fuel pump consisting of a block including a main operative chamber subdivided by said piston into two compartments whereby the feed of the first compartment with air and the draining of the second compartment produce a stoppage of the injection of fuel inside the engine and the feed of the second compartment with air and the draining of the first compartment produce the injection of the amount of fuel required for starting the engine, and furthermore means feeding with air and draining each of said compartments selectively.

2. A system as claimed in claim 1, wherein said means feeding the compartments with air and draining same include a distributor adapted to occupy selectively an operative position upon supply of air from said means for detecting the direction of rotation of the engine and an inoperative position cut-off of air from said means for detecting the direction of rotation, said distributor being constituted by a slider adapted to move under the opposing action of the air fed to it and of a spring, said slider being provided with a peripheral recess connecting the admission of air from the starting valve selectively, with said first compartment when the slider is in its inoperative position and with the second compartment when the slider is in its operative position.

3. A system as claimed in claim 2, wherein said means feeding said compartments with air and draining same include furthermore a closing member inserted between the distributor and said first compartment and provided with a chamber communicating with the stopping valve at the main control station.

4. A system as claimed in claim 3, wherein said means feeding said compartments and draining same include furthermore a safety closing member inserted between said distributor and the first-mentioned closing member, said safety closing member being provided with a chamber connected with an electrically-controlled valve inserted in a safety circuit and also connected with said distributor through a channel also connected, when said slider is in its operative position, with an axial passage formed in said slider and opening into a draining port formed in the chamber defined by said slider.

5. A system as claimed in claim 4, wherein said slide valve distributor associated with said speed reversing apparatus comprises a slide valve driven by said speed reversing apparatus and provided with two series of three channels, one of said series of three channels providing simultaneously communications, for one end of operative action of the speed reversing apparatus, from said starting valve in the main control station to said means for opening said main valve controlling the starting air, from said starting valve in the main control station to said means for detecting the direction of rotation of the engine, and from said means for detecting the direction of the engine to said distributor of said unit controlling the admission of fuel, respectively.

6. A system as claimed in claim 5, wherein said means for detecting the direction of rotation of the engine include two pistons arranged symmetrically to either side of a plane passing through the axis of a hub driven by the engine, each piston engaging said hub with the interposition of a block adapted to collapse so as to allow the piston to be urged inwardly of its cylinder whenever the engine revolves in its normal direction and held in position by a stop preventing the piston from being urged inwardly whenever the engine revolves in an abnormal direction, a cylinder enclosing each piston and being provided with a lateral port communicating with said unit controlling the admission of fuel, the position of said port being such that it receives the air reaching the detector of the direction of rotation only when said piston has been depressed inside its cylinder.

7. A system as claimed in claim 5, wherein said means for detecting the direction of rotation of the engine include a gear pump driven by the engine and including two symmetrical distributing pistons, two sliders arranged symmetrically and rigid with each other and a fluid-carrying container, one of the distributing pistons providing admission of air to the control unit of said fuel pump under the action of the delivery pressure of said pump and said sliders controlling the admission of fluid to said gear pump out of said container and adapted to prevent said feed of fluid whenever the engine revolves in an abnormal direction.

8. A system as claimed in claim 5, wherein said means for detecting the direction of rotation of the engine are constituted by an electric apparatus including a magnetized rotor driven by the engine, a stator adapted to rock round its axis in a direction defined by the direction of rotation of the engine, two symmetrical switches forming stops actuated by said stator and two circuits including electrically controlled valves closed respectively by the corresponding switches to make one of said electrically controlled valves feed with air the control unit for the fuel pump whenever the engine revolves in a normal direction.

References Cited

UNITED STATES PATENTS

| 2,413,390 | 12/1946 | Stevens | 123—41 |
| 2,444,273 | 6/1948 | Stevens | 123—41 X |
| 2,550,931 | 5/1951 | Linhart | 123—41 X |
| 2,580,368 | 12/1951 | Stevens et al. | 123—41 X |
| 2,580,372 | 12/1951 | Whitney | 123—41 |
| 2,911,960 | 11/1959 | Benz et al. | 123—41 |

WENDELL E. BURNS, *Primary Examiner.*